United States Patent
Herwig

(10) Patent No.: US 9,922,358 B2
(45) Date of Patent: Mar. 20, 2018

(54) AUGMENTED REALITY FOR ASSISTING CONSUMER TRANSACTIONS

(71) Applicant: NCR Corporation, Duluth, GA (US)

(72) Inventor: Nathaniel Christopher Herwig, Lawrenceville, GA (US)

(73) Assignee: NCR Corporation, Atlanta, GA (US)

( * ) Notice: Subject to any disclaimer, the term of this patent is extended or adjusted under 35 U.S.C. 154(b) by 429 days.

(21) Appl. No.: 14/680,596

(22) Filed: Apr. 7, 2015

(65) Prior Publication Data
US 2015/0213544 A1 Jul. 30, 2015

Related U.S. Application Data

(62) Division of application No. 13/307,855, filed on Nov. 30, 2011, now Pat. No. 9,020,838.

(51) Int. Cl.
*G06Q 30/06* (2012.01)
*G06Q 30/02* (2012.01)
*H04W 4/02* (2018.01)

(52) U.S. Cl.
CPC ..... *G06Q 30/0625* (2013.01); *G06Q 30/0281* (2013.01); *G06Q 30/06* (2013.01); *G06Q 30/0623* (2013.01); *G06Q 30/0633* (2013.01); *G06Q 30/0639* (2013.01); *H04W 4/02* (2013.01)

(58) Field of Classification Search
CPC .... G06Q 30/02; G06Q 30/06; G06Q 30/0601; G06Q 30/0613; G06Q 30/0633; G06Q 30/0639; G06Q 30/0261; G06Q 20/02; H04W 4/02
USPC ...................... 705/26.1, 26.41, 26.9; 235/383
See application file for complete search history.

(56) References Cited

U.S. PATENT DOCUMENTS

| 7,580,866 B2* | 8/2009 | Church | G06Q 30/02 705/26.41 |
| 8,983,488 B2* | 3/2015 | Sweeney | H04W 4/02 455/404.2 |
| 9,286,639 B1* | 3/2016 | Patzer | G06Q 40/10 |
| 2004/0203909 A1* | 10/2004 | Koster | H04W 4/02 455/456.1 |
| 2008/0245863 A1* | 10/2008 | Buchheit | G06Q 30/02 235/383 |
| 2009/0156182 A1* | 6/2009 | Jenkins | G06F 17/3087 455/414.2 |
| 2010/0080163 A1* | 4/2010 | Krishnamoorthi | H04L 12/189 370/312 |

(Continued)

OTHER PUBLICATIONS

Asthana, Cravatts, and Krzyzanowski, "An Indoor Wireless System for Personaiized Shopping Assistance"; Published in Mobile Computing Systems and Applications, 1994. Proceedings. pp. 69-74 Print ISBN: 0-8186-6345-6 INSPEC Accession No. 4923983; extracted from google on 11/121/2017.*

*Primary Examiner* — Yogesh C Garg
(74) *Attorney, Agent, or Firm* — Schwegman, Lundberg & Woessner

(57) ABSTRACT

A portable device which assists shoppers. The device identifies items of merchandise, and retrieves information about the items from a remote location. The items can be identified based on their labels, by image recognition, by their location, by the shopper, or by other approaches. This additional or enhanced information about the items can then be overlaid on the real-time display of the portable device, such that the shopper has access to said information and can associate it easily to the relevant items.

5 Claims, 7 Drawing Sheets

(56) References Cited

U.S. PATENT DOCUMENTS

| | | | |
|---|---|---|---|
| 2010/0131850 A1* | 5/2010 | Berus | G01C 21/3632 |
| | | | 715/727 |
| 2012/0036476 A1* | 2/2012 | Oh | G06F 3/0481 |
| | | | 715/811 |
| 2012/0233003 A1* | 9/2012 | Calman | G06Q 30/06 |
| | | | 705/16 |
| 2013/0132279 A1* | 5/2013 | Nordstrom | G08C 19/00 |
| | | | 705/44 |
| 2015/0039462 A1* | 2/2015 | Shastry | G06Q 30/0633 |
| | | | 705/26.7 |

* cited by examiner

AUGMENTED REALITY FOR ASSISTING CONSUMER TRANSACTIONS

The invention concerns portable devices which obtain information about items within a retail store, or other venue. The information augments that which is already known to the customer.

BACKGROUND OF THE INVENTION

The widespread use of computers has made available a vast amount of information to consumers. When a consumer embarks on an ordinary shopping trip, or a special trip to make a large purchase, the consumer can make more intelligent choices if he or she is assisted by relevant information. However, such information can be cumbersome to obtain in a simple manner, and the consumer often does not know in advance what information they need or which products they will find interesting at the store.

The invention facilitates intelligent shopping by making useful information readily available to consumers within the store premise.

OBJECTS OF THE INVENTION

An object of the invention is to provide information about items which a consumer considers for purchase, in a simple manner.

SUMMARY OF THE INVENTION

In one form of the invention, a person carries a computing device into a retail store. The person uses the device to (1) identify nearby merchandise, and then (2) retrieve information about the merchandise, from a local network, the Internet, or both.

DETAILED DESCRIPTION OF THE INVENTION

Figure 1:
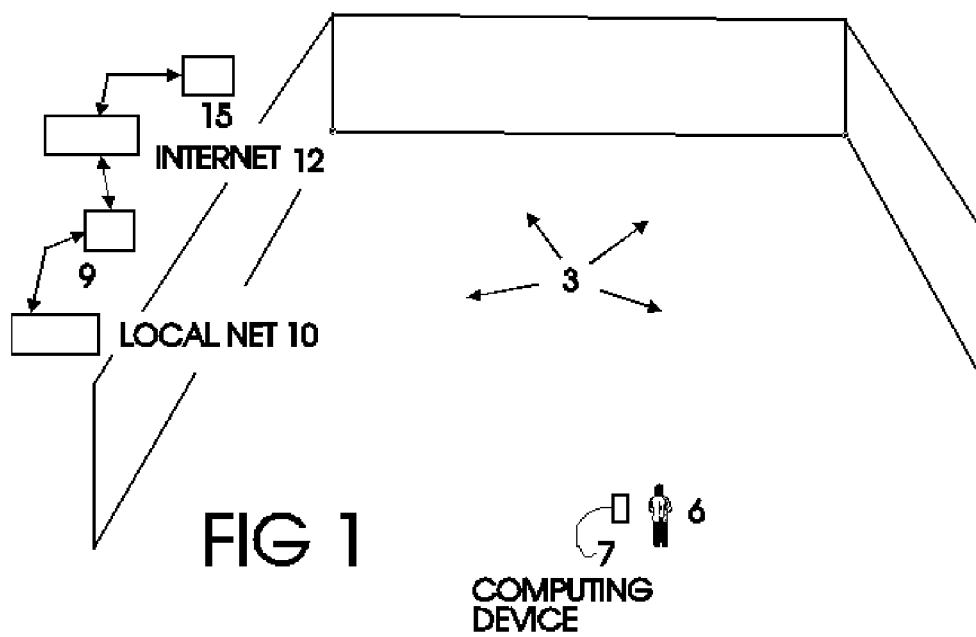
FIG. 1 illustrates a situation in which the invention 7 can be used.

FIG. 1 shows a geographic site or venue 3, which a person 6 is about to enter. The venue 3 may take the form of a retail store, retail mall, museum, national park, sports stadium, zoological park, theater, exhibition hall, military cemetery, ancient battlefield, or any location which contains features or objects about which the person 6 would like to obtain information.

The person 6 is equipped with a portable computing device 7, which receives the information described below, and displays it. Device 7 can take the form of a mobile phone (or "smart phone") which has an onboard camera and access to wireless and/or cellular data networks. Other forms of the computing device 7 might be a portable computer or a mobile tablet, appropriately programmed, and equipped with wireless access to external networks.

In FIG. 1, block 9 represents a computing facility which is under the control of the agency which owns, or manages, the venue 3. Block 9 can make information available to the person 6 by way of the Internet 12, through wireless linkages. Alternately, a local network, such as WiFi, can be used, which is under the direct control of the venue 3, and not involved in public transmission of data, as is the Internet.

Block 15 represents another computing facility, but under the control of a third party, which can make additional information available to the person 6. Block 15 can include a computing facility, and can communicate over the Internet 12. The additional information can be developed independently of the agency which operates the venue 3, and acts as a secondary source of information for the person 6.

In one form of the invention, block 15 communicates with device 7 exclusively through a public carrier, such as the Internet 12, and block 9 communicates exclusively through a non-public medium under control of the venue 3, such as a local wireless network 10.

Some generalized examples are given which illustrate operation of the apparatus of FIG. 1, followed by a detailed discussion of techniques of implementation.

FIRST EXAMPLE

A first example relates to purchasing wedding gifts. Venue 3 is a retail store which sells wedding gifts, and other items. In the United States, it is common for couples who are about to be married to list themselves on a registry, which indicates their preferences for wedding gifts.

Under the invention, the registry is retrieved by block 9 from the store's server, and transmitted to the device 7. This allows the person 6 to ascertain which gifts on the registry have been purchased, and which remain unpurchased, so that duplicate gifts are not purchased for the couple.

SECOND EXAMPLE

A second example is perhaps most applicable to the larger retail stores. Block 15 stores a map of the store, which indicates locations of all the goods held for sale. The device 7 downloads the map from block 9. This map assists the person 6 in locating items desired for purchase. An index, or legend, indicates the locations of items on the map, to facilitate location of specific items.

THIRD EXAMPLE

A third example is a type of enhancement of the second example. The person 6 prepares a shopping list, loads the list into device 7, and visits the venue 3. Device 7 cooperates with block 9 to guide the person 6 through the venue 3 in the most efficient manner, to obtain the items on the list.

Known software routines in the network sciences, such as those used to solve the "traveling salesman" problem, can be used to establish the routing.

FOURTH EXAMPLE

In a fourth example, the person 6 utilizes device 7 to obtain information about a specific product encountered by the person 6 at the venue 3. The device 7 identifies the product, such as a coffee grinder, and then obtains information about the product through block 9. The information can include data on price, warranty, number of items held in stock, sizes and colors available, and so on.

Multiple levels of information are possible. A first level is determined based on statistical sampling of customers, and includes the information requested by most customers, and is presented by default. A second level can include more detailed information, such as installation instructions or material hazard data, and so on. The information of the second and further levels is presented only if requested.

FIFTH EXAMPLE

In a fifth example, block 9 transmits additional information to device 7, such as descriptions of goods which are frequently purchased along with the coffee grinder. Alternately, block 9 can transmit information of general interest.

This additional information can promote goods which are complementary to the item in question. Alternately, the additional information can describe similar goods of different quality, or having different features, or which are considered substitutes for the coffee grinder.

It is pointed out that device 7 itself receives and displays the information, and not a device under control of the venue 3, such as a self-service kiosk provided by the venue 3. This provides several advantages. One is that the person 6 is familiar with the operation of his own device 6, and need not learn how to operate a strange machine provided by the venue 3.

A second advantage is that it is common for people to encounter public information kiosks which are malfunctioning. It can be difficult to tell whether a delay in responding by such a kiosk is the result of a malfunction, or is a normal delay. Use of device 7 eliminates the issue entirely.

A third advantage is psychological. Many people will place trust in information retrieved by their own devices 7, as opposed to information displayed on a possibly malfunctioning public kiosk. Restated, it appears that when a person becomes familiar with the normal sequence of events of the person's own device 7, the person attributes trust to the data when that normal sequence occurs. However, a public kiosk will probably undertake a different sequence so that, even if the same information is presented, doubt seems to arise in the person's mind because of the unfamiliar sequence in presentation.

It seems axiomatic that the familiar is trustworthy. The invention seeks to make that which is familiar available to the customer.

SIXTH EXAMPLE

In a sixth example, the venue 3 is a zoological park. The information of the type in the fourth example, above, would relate to the animals who live there, and their habits. The information of the fifth example could relate to books about the specific animals, which are available for purchase.

Similar principles would apply if the venue 3 is an automobile raceway, where the information provided concerns the race cars, or drivers. If the venue 3 is a baseball park, the information provided would concern the players, their team, and so on.

The processes of obtaining information, described above, apply to the various types of venue enumerated above.

SEVENTH EXAMPLE

In a seventh example, the venue 3 is an automobile dealership. Block 9 can make information available about the cars, which information is provided by the dealership, or the manufacturer. Block 15 can make available independent evaluations made by a testing service, such as the Consumers Union in the United States.

EIGHTH EXAMPLE

In an eighth example, the venue is again a large retail store. The person 6, in general, cannot see from a single location the signs which describe the contents of all shelves in the store, and thus, for example, cannot immediately locate garden hoses. Block 9 transmits a map to device 7, together with an index. The person 6 locates garden hoses in the index, and then device 7, perhaps together with block 9, indicate the location of garden hoses on the map, which is displayed on device 7.

NINTH EXAMPLE

In a ninth example, the location of the device 7 within the venue 3 is ascertained. That location also indicates, by inference, the location of the person 6. Block 9 can then use that location information to further assist the person 6.

For instance, the person 6, through device 7, can request assistance of a staff member of the venue 3. Since block 9 knows the location of the device 7, block 9 can direct the staff member to that location, which is the location of person 6.

Alternately, knowledge of the location of the person 6 can allow block 9 to direct the person 6 to a specific product, by giving the person 6 directions, without direct, in-person assistance of a staff member, although a staff member may be involved in sending messages which contain the directions.

TENTH EXAMPLE

In a tenth example, a second device 7 is used, and attached to a small child who belongs to person 6. This second device 7 may include a serial number which block 9 can interrogate. If person 6 develops the belief that the child has wandered away, person 6 can request, through device 7 or otherwise, block 9 to locate the child, by way of locating a device 7 having the serial number. Device 7 could be linked to an in-store tracking system, such that anyone attempting to remove the child from the store through any of the monitored doorways would raise an alarm, both to store personnel and to the parents' (e.g. person 6) mobile devices.

ELEVENTH EXAMPLE

Many large retail stores also provide (1) automotive services, such as the sale of tires and other parts, and (2) automotive repairs. Person 6 may leave a car to be serviced, and, when service has finished, venue 3 can notify person 6 of that fact, by transmitting a message from block 9 to device 7.

In addition, if extensive servicing is expected, venue 3 can notify device 7 of the progress being made, together with an estimated time of completion.

TWELFTH EXAMPLE

The device 7 can act as an advanced loyalty card, with benefits provided to the person 6. The benefits can include discounts, or standard loyalty points.

In one form of the invention, the location of device 7 within the venue 3 can be ascertained. That will allow the managing agency of the venue 3 to track the movements of person 6, and to learn, for example, where the person 6 spends most time, and what places the person 6 avoids. It is pointed out that a standard loyalty card provides different information, namely, information as to what a customer actually purchased, not where in the venue 3 the customer spent time.

In addition, the requests for information about products made by the device 7 indicate the interests of the person 6.

Tracking the activities of device 7 and consumer 6 in "real-time" can provide useful market research.

THIRTEENTH EXAMPLE

The invention provides a virtual dressing room for purchasers of clothing and other items of apparel. The device 7 is equipped with a virtual mannequin which matches the physique of person 6. That is, the virtual mannequin is a three-dimensional CAD (Computer Aided Design) data set, or wire-frame model, which corresponds in shape to person 6. This virtual mannequin can be developed, for example, by measurements taken by a professional tailor.

The person 6 then identifies an article of clothing at the venue 3, using device 7. Block 9 contains a collection of virtual costumes, which includes the article selected. The device 7 then places the selected costume onto the virtual mannequin, and displays the results. Since the displayed results are based on three-dimensional CAD data, the mannequin can be rotated, bent, and so on, to illustrate the appearance of the costume in different poses.

The virtual mannequin can be equipped with an actual photograph of the head of person 6, which is scaled to match the mannequin. In addition, several photographs of the head can be provided, taken from different angles, to match different poses in which the mannequin can be placed.

A default set of poses, which correspond artistically to the views of the head in the several photographs, can be offered, to the exclusion of other poses. The latter poses may look awkward, or even be impossible physiologically, because the position of the head, in a photograph, may not match visually a selected pose.

To reduce the latter problem, an actual CAD rendition of the person's head can be generated, so that a near-infinite number of positions can be selected, to match poses of the mannequin.

Still further, renditions of the costume, and/or the head, can be made in different lighting conditions, such as high-noon daylight, candle light, fluorescent factory lighting, and so on. These lighting conditions can provide a more accurate prediction of how the costume or apparel will look in the environment where the costume is expected to be worn.

Posable virtual mannequins, with selected costumes, are commercially available, as through the software package known as "Poser," available from Curious labs, Santa Cruz, Calif., USA.

FOURTEENTH EXAMPLE

This is a variant of the thirteenth example.

People who wear eyeglasses purchase eyeglass frames. Optical shops contain numerous sample frames.

But when a person tries to select a sample frame which suits his/her face, the sample frame will not contain proper lenses which match the person's eyes. Consequently, the person cannot accurately see in a mirror how the frame looks on his/her face. This is particularly true if the person has just had an eye examination, and, as a result, the person's pupils are dilated.

Under one form of the invention, device 7 is equipped with a photograph of the face of person 6. The person 6 selects a sample frame at an optical shop. Block 9 delivers an image of the selected frame, which is added to the photograph of the face. The image of face-plus-frame is displayed by device 7. In this manner, the person 6 can look at the combined image, displayed on device 7, through his/her own correct eyeglasses, and accurately see the image. This approach is in contrast to looking in a mirror without wearing eyeglasses, in the attempt to examine sample glasses frames, lacking lenses, which are perched on the nose.

In a simple implementation of this approach, a straight-on head shot of the person 6 is obtained. An analogous shot of a sample frame is obtained. Both images are bitmaps, as in the JPEG format. The bitmap of the frame is scaled by computer adjustment to match the head shot, if necessary, and pasted onto the head shot.

In one approach, a real-time photograph, or video image, of the person 6 is taken by an optical shop. That image is displayed on a screen maintained by the shop, or perhaps on device 7. Then an image of the selected frame is overlaid onto that image of the face.

Technical Aspects

It was stated above that the device 7 in FIG. 1 identifies an item within the venue 3, such as a coffee grinder on display at a retail store. This identification is then transmitted to block 9, to obtain further information about the item. Several approaches to making the identification will be discussed.

It is pointed out that "identification" of a coffee grinder does not necessarily mean simply identifying it as within the generic class of coffee grinders. It can also mean identifying the coffee grinder with sufficient specificity, by manufacturer and model number, so that block 9 knows which of the many coffee grinders stocked by the store is being referenced. This latter specific identification allows block 9 to retrieve information relevant to that particular coffee grinder, to the exclusion of other coffee grinders.

Several approaches are available to identify the items.

APPROACH 1. This approach uses image recognition, and also operator-assisted image recognition.

Figure 2:
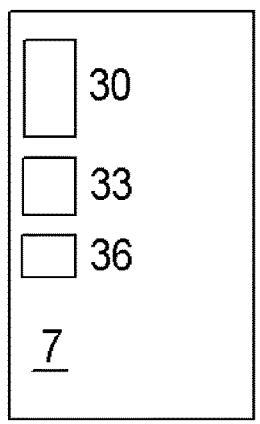
FIG. 2 is a schematic view of device 7 of FIG. 1.

The device 7 in FIG. 2 is equipped with a camera 30 which captures an image of an object, and produces a digitized image of the object. Image recognition software 33, known in the art, analyzes the image and identifies the object.

Another approach is to capture an analog image, take a Fourier transform, and then identify the object by comparing the Fourier transform with Fourier transforms of reference objects. In a variation, a digital image can be taken of the object, and a Fourier transform of the digital image can be used, as just described.

Under either approach, it may be helpful for the human operator to assist the image recognition software. For example, the operator may initially inform the software that the object to be identified is contained within a particular class, such as golf equipment. This will prevent the software from mis-identifying a golf putter as a hockey stick.

Alternately, this assistance may be deduced from the location of the device 7. Determining location is discussed later. For example, if the device 7 is deduced to be near golf equipment, then it is assumed that any image taken by the device 7 will be of golf equipment, and not of cleaning supplies.

It may not be necessary that the recognition software conclusively identify an object, but it may be sufficient if the software concludes that the object in question is one of a fixed number of possibilities. For example, the software may reduce the possibilities to a 5×5 matrix, containing 25 possible objects in total, which can be displayed on a single computer screen. The person 6 then selects the correct object.

Further, this latter approach may be continuously interactive with the person 6, while the software deduces the identity of the object in question. For example, the software may initially deduce the size of the object, and may ask for confirmation that the deduction is correct.

In the case of size determination, the software may not ask the person 6 to indicate an absolute size, in inches, but may be equipped with several common reference markers as to size, such as (1) wristwatch, (2) peanut butter jar, (3) cigar box, (4) loaf of bread, (5) suitcase, (6) steamer trunk, (7) easy chair, and so on. Initially, when the software has reached a preliminary conclusion as to size, it will ask a question such as "Is the object about the size of a loaf of bread?" and the person will answer appropriately.

The software will then advance to other categories, such as weight, cost, type of use, and so on, and ask for confirmation of its preliminary conclusions.

Therefore, in one approach, the device 7 identifies an object of interest within the venue 3 through image recognition. In one variation, the person 6 assists the identification, by correcting the conclusions, or providing information as to characteristics of the object.

In the latter case, the image recognition software contains various categories, such as size, weight, color, and so on. The software asks the person 6 for specific values in each category, such as the specific size, specific weight, specific color, and so on, to assist its deduction of the identity of the object of interest.

In another variation, the software does not reach a conclusion as to the unique identity of the object in question, but instead reduces the universe of possibilities to a specific number of identities, such as the number 25 stated above. Then the person 6 selects the correct identity from that reduced universe.

For example, the object in question may be a sports car, with a convertible top. The software would respond by listing the possibilities, and the person 6 would select the correct make and model from the possibilities presented.

APPROACH 2. Quick Response codes, QR codes, are known in the art. A QR code allows a person X to store data on the Internet, and a person Y to scan the QR code, and obtain access to the information.

QR codes, at present, resemble small checkerboards, roughly the size of postage stamps, each having a specific pattern of squares being colored in a specific way.

For example, assume a checkerboard having 10×10 squares, or 100 squares total. Assume that each square is either black or white. This checkerboard is, in essence, a 100-bit binary number, and can uniquely identify a number equal to (2 raised to the 100th power) different items (minus any bits reserved for error detection and correction).

Of course, larger numbers of squares, and larger numbers of colors, can increase the possible binary numbers which a QR code represents.

QR codes can be attached to the objects, to identify them. Or QR codes can be attached to known points in the venue 3 of FIG. 1, to allow device 7 to determine its location. Determination of location is described in greater detail below.

QR codes are commonly used as follows. A QR provider creates a multitude of QR codes, and sells them. The QR provider also creates a web site, or equivalent, and assigns each QR code to a space within the web site. The QR provider also maintains an index, which contains an entry for each QR code, that is, each number represented by each QR code has a line in the index. Each line points to the space at the web site assigned to the QR code.

For example, assume that Buyer A purchases QR code A, which is assigned a space A. Buyer A places information into the space A. When a third party optically scans the QR code A, that third party then consults the index, and thereby learns the address of the space A within the QR provider's web site. The third party can visit that space A, and retrieve information which buyer A has placed there.

Therefore, a QR code allows a person X to store data on the Internet, and a person Y to scan the QR code, and obtain access to the information.

A QR code can be assigned to each object described herein. The data described herein, which is associated with the item, is stored in the space assigned to the QR code. This data would be stored in server 9 in FIG. 1, although other locations are possible. A person who scans a given QR code obtains access to the stored data.

In one form of the invention, the operator of the venue 3 in FIG. 1 can handle storage of the data corresponding to the QR codes.

APPROACH 3. The device scans the UPC, Uniform Product Code, of an item to identify it. Alternately, the user of the device types the UPC into the device, analogous to the situation when a check-out clerk cannot use a scanner to read an illegible UPC.

APPROACH 4. Under this approach, device 7 identifies items based on the position of device 7 within the venue 3. How device 7 determines its position is explained later. But once the device 7 deduces its position, it can learn the identities of the item or items which are near it, from a map provided by the manager of the venue 3.

Under this approach, the manager of the venue 3 maintains data which indicates the spatial distribution of the items within the venue 3: the manager maintains a map showing where all items are located. The data, or map, is made available to device 7 through server 9.

Figure 3:
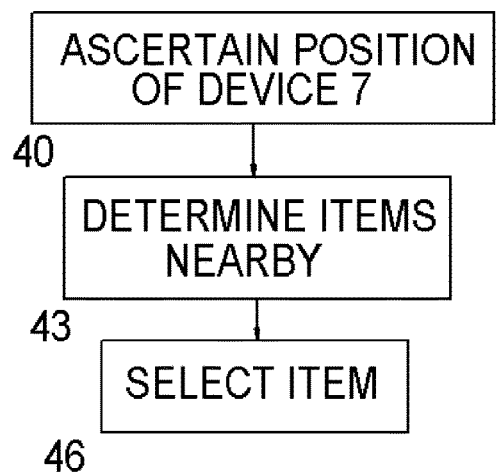
FIG. 3 is a flow chart of processes undertaken by one form of the invention.

Device 7 then (1) ascertains its current position within the venue 3, as in block 40 in FIG. 3, and (2) retrieves data which describes the items located at that position, within a convenient distance, such as ten feet, as in block 43.

Preferably, the convenient distance is chosen so that the number of items listed will fit onto a single display screen of the device 7. For example, if the items are automobiles at a dealership, the convenient distance will be large. If the items are diamond rings, the convenient distance will be small.

The person 6 then selects an item of interest from those nearby listed on the device 7, as in block 46, and device 7 retrieves and displays information about the item selected. Of course, if a single item is present nearby, no selection operation is required.

The transfer of the data, or map, to the device 7 can be accomplished by a network which is accessible to customers, such as a WiFi network. Item 9 in FIG. 1 can represent such a network.

The device 7 provides the person 6 with the option of determining the convenient distance discussed above. If the person 6 selects a sufficiently large convenient distance, then the items displayed, or the map containing them, will include the entire venue 3 of FIG. 1. The device 7 provides a zoom-in, zoom-out function to navigate through the map.

In one embodiment, the device 7 displays the map, with items in their appropriate positions. The person 6 positions a cursor on the map which indicates the person's position. In response, the device locates all items located within the convenient distance from the cursor, and displays them. The user selects an item. In this embodiment, the person 6 is the agency which inputs data indicating the position of the device 7 to that device 7. The device 7 does not infer its own position, nor does block 9.

In another form of the invention, the position of the device 7 within the store is determined without human intervention. Robotic systems are known for determining the position of objects, such as automated trolleys, within a building.

APPROACH 5. The person 6 can undertake an interactive description which progressively refines a definition of an object sought, until an exact description is attained. Thus is done using the device 7, in conjunction with communication with server 9 in FIG. 1.

For example, assume that the person 6 is looking for an air filter for a vehicle. The device 7 can first ask whether the vehicle is a passenger car or truck. Then the device 7 asks for the manufacturer, also called "make," as in "maker," (eg, General Motors, Chrysler, etc.). Then the device 7 asks for the year of manufacture. Then the device asks for the model (eg, if General Motors is the manufacturer, some possible models would be Chevrolet, Cadillac, and so on).

This process will progressively limit the number of possible air filters which will qualify, until the questions finally lead to the identity of the vehicle in question, which, in effect, specifies the required air filter. Then device 7 indicates where in the venue 3 the air filter is located, by consulting data provided by the manager of the venue 3.

This process is different from a similar process in which the person identifies an air filter using a self-service kiosk at a store. This process has the psychological benefits discussed above.

APPROACH 6. The device 7 is equipped with a GPS, Global Positioning System, which indicates the latitude and longitude of the device. Block 36 in FIG. 2 indicates the GPS. Knowledge of those coordinates allows deduction of the building, or business, at which the device is located, by reference to known tables. A GPS is also capable of indicating position within the venue 3, with an accuracy of at least a few feet.

Alternately, the venue 3 may be equipped with RFID (Radio Frequency IDentification) tags, which are distributed throughout the venue 3. For example, if the venue is 100×100 feet in size, then 100 squares, each 10×10 feet, can be defined in the venue 3, like a checkerboard. Each of the 100 squares can be given a number.

Each square is equipped with an RFID tag. Device 7 is equipped with an RFID tag reader. The person 6 orders the device 7 to interrogate a nearby tag, and thereby the device 7 learns the 10×10 square in which it is located.

Figure 4:
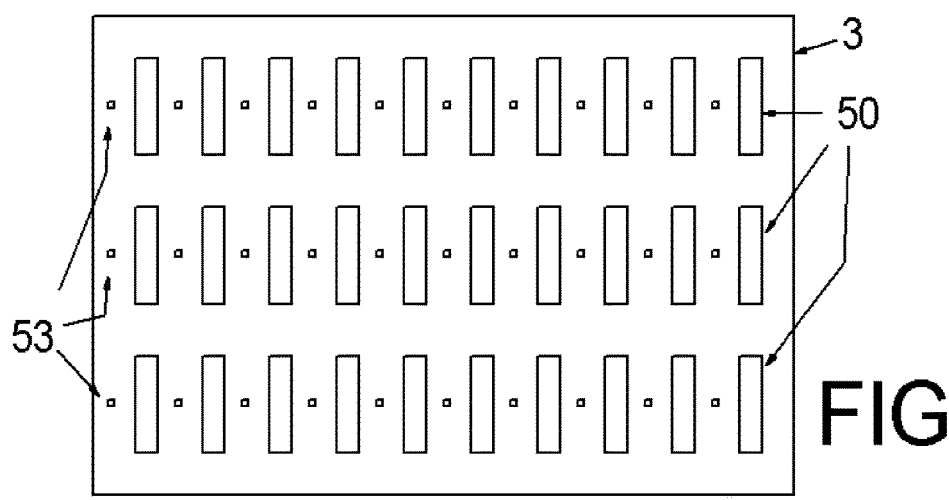
FIG. 4 is a bird's eye view of the interior of a venue 3 of FIG. 1, taking the form of a retail store containing shelves 50.

FIG. 4 illustrates a venue 3, which contains ranks of shelves 50. Blocks 53 indicate RFID tags which are distributed throughout the venue 3. Each tag 53 contains data, such as a number, which identifies its location.

In another embodiment, each square in the 10×10 example above can be labeled with a visual label, which contains a number, or other coordinates. The person 6 examines the labels, and manually enters the labels, or coordinates, into device 7, which then ascertains its position on the map discussed above.

APPROACH 7. The device 7 in FIG. 5 can be equipped with a rangefinder 60, as used by golfers or the military. The rangefinder 60 allows computation of distance D to a target item T. From this distance D, and the compass direction along which D runs, which is deduced using a known compass 63 within the device 7, latitude D1 and longitude D2 in FIG. 5 can be deduced, or equivalent x-y coordinates can be deduced.

Thus, the latitude and longitude of the target item T becomes known, which indicate the location within the venue 3, and the identity of the target item T can be inferred from known tables. The tables, or maps, list all items according to their locations. The tables are provided, for example, by the managing agency of the venue 3.

Figure 5:
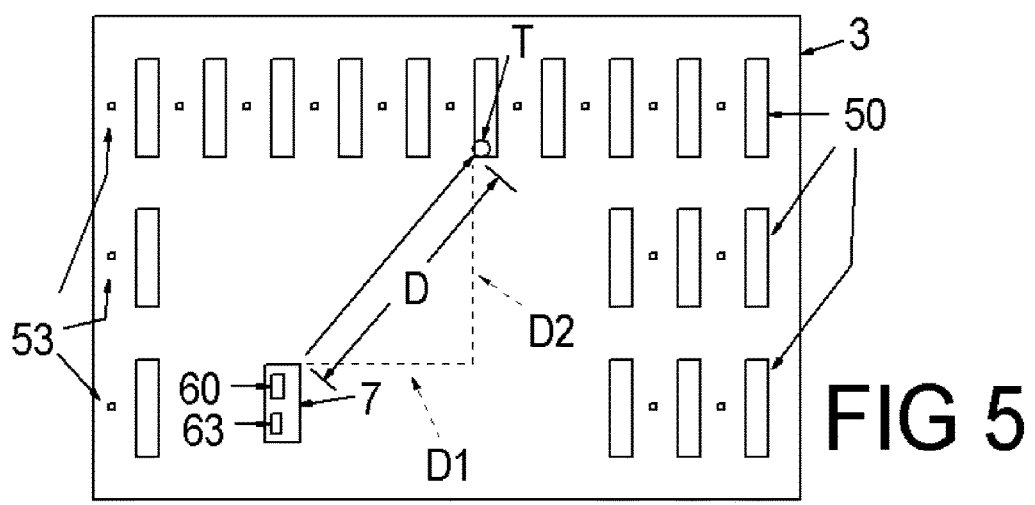
FIG. 5 is a variant of FIG. 4.

This approach allows the person 6 in FIG. 1 to identify an item T in FIG. 5 which is located at a specified distance D, in a specified compass direction, with respect to the device 7. In effect, the device 7 identifies the polar coordinates of the item, with respect to itself. Device 7 acts as the origin. Then device 7 converts those relative polar coordinates to the coordinates in which the item T is listed on the tables, or map.

APPROACH 8. The venue 3 makes available tables which indicate the identities of items located at stated positions within the store. The person 6 using the device 7 identifies an item using the tables. Table 1, below, provides an example.

| X-coordinate | Y-coordinate | Item present |
|---|---|---|
| X1 | Y1 | Item A |
| X1 | Y2 | Item B |
| X2 | Y1 | Item C |
| X2 | Y2 | Item D |

The device 7, or the person 6, or both cooperatively, locate the item within the tables, and the tables provide the location, relative to the map, of the item. In this manner, the location of the device 7, in coordinates which block 9 can understand, is obtained. But the location of device 7 is deduced from the identity of nearby items.

In a simpler version, a nearby class of products, such as women's shampoos, is identified, and the class identified is communicated to block 9. The fact that device 7 is located near women's shampoos generally may provide sufficient accuracy in some situations.

If the item used for location identification is located on a shelf, and if other items are above and below it, so that multiple items possess the same coordinates, the device 7 reports those multiple items, and allows the person 6 to select the desired item from the collection of items which share those coordinates.

The tables under consideration are made available to the customer in a known manner, as by being posted at a web site, or downloadable by direct transfer to the device from a machine at the store.

Interim Conclusion

Therefore, as so far described, the device 7, perhaps in cooperation with person 6, identifies an item within the venue 3. The computer system of block 9 then transmits information about the identified item to the device 7.

The identification of the item can be done by including the position of device 7 within the venue 3, to narrow the universe of possible items. For example, as explained above, the venue 3 can provide a map on which items for sale are identified. If the location of the device 7 is known, then the items which are located within a fixed distance become known.

The identity of the item, or group of items, may be deduced based on the location of the device 7 which is near the items. For example, if the location of device 7 is known, then maps or tables can indicate which items are present within a radius of, for example, ten feet. Those items are presented to the person 6 in FIG. 1, by way of the device 7, and the person selects an item of interest. The item selected is thus unambiguously identified to the venue 3, because the venue 3 initially presented the item to the person 6, within the group of items.

Conversely, the location of the device 7 can be deduced by the reverse process. The person 6, or the device 7, individually or cooperatively, identify nearby items. Then, based on maps or tables, the location of the device 7 is deduced, based on the identities of the items.

The preceding discussion has been framed largely in terms of obtaining information about a subject which is viewed by the portable device 7. Another aspect of the invention concerns the manner of displaying the information, once obtained.

Figure 6:
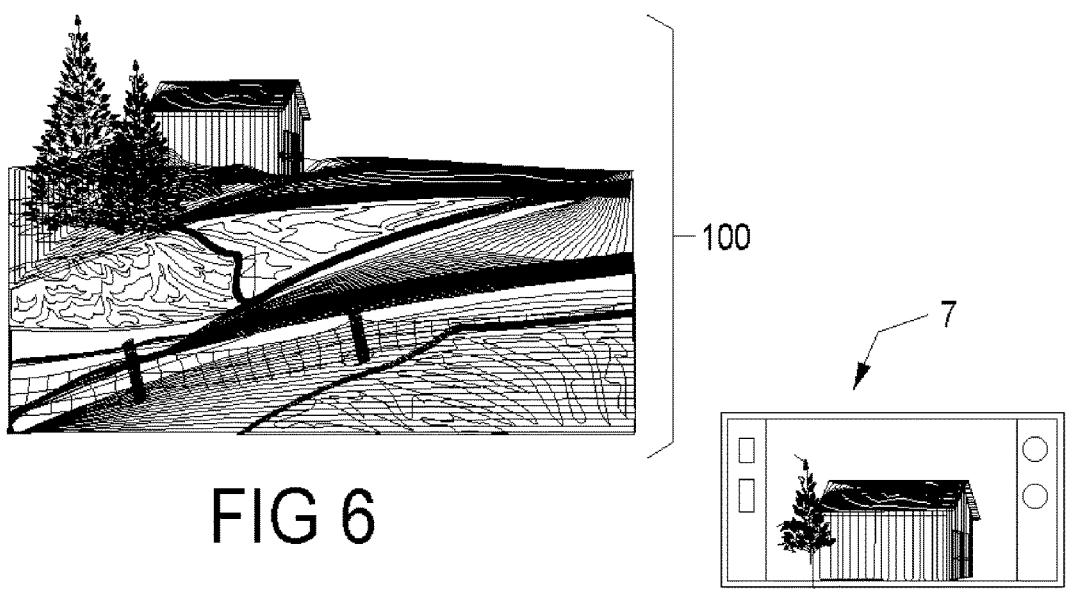
FIG. 6 illustrates a landscape 100, and represents a generic view taken within the venue 3 of FIG. 1

FIG. 6 illustrates a landscape 100, and represents a generic view taken within the venue 3 of FIG. 1, such as a view of (1) shelves in a retail store, (2) exhibits in a museum, and so on. In FIG. 6, the portable computing device 7 is shown, which is present at the landscape, and displays an image of part of the landscape 100.

Figure 7:
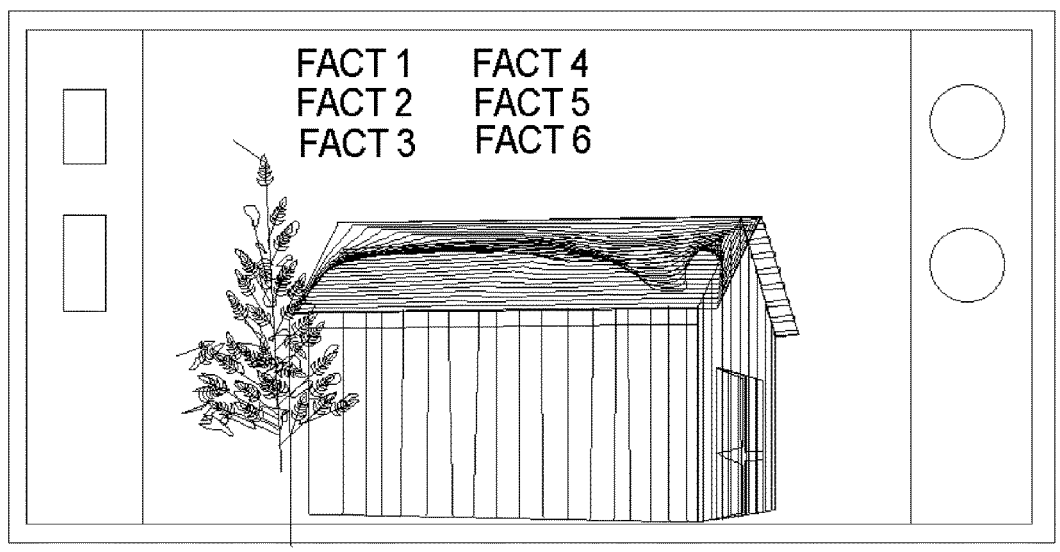
FIG. 7 illustrates the image of FIG. 6, together with augmentation added by the invention.

FIG. 7 illustrates that image, together with augmentation in the form of several FACTs. The image of FIG. 7 can be described as an augmented reality, in the sense that the image of the landscape 100 of FIG. 6 acts as the reality, and the FACTs of FIG. 7 represent augmentation of that reality.

For example, in the retail scenarios described above, the image of FIG. 7 would be replaced by images taken of the interior of a retail store. The FACTs of FIG. 7 would be replaced by information which is of interest to the customer in possession of the device 7. Such information can be included within banners on the device 7 in FIG. 7, and can indicate items which are currently promoted by the store. The banners would point to locations on the image which correspond to the actual locations in the store where the promoted items are located. In this manner, the attention of the customer is drawn to the actual location within the store where the promoted items reside. In another embodiment, the FACTS of FIG. 7 might "hover" near an associated element in the scene. Using the aforementioned store shelf example, a banner containing the price of an item and the number of units in stock might hover immediately above a particular merchandise item.

As another example, in the shopping list scenario described above, the image of FIG. 7 would be replaced by an image seen by the device 7 within the retail store. The invention ascertains whether items contained on the customer's shopping list are present within that image and, if so, one or more FACTs of FIG. 7 would indicate (1) the identity of the item found and (2) the location of that item within the image. The indicated location tells the customer where in the store the item is located. Additional FACTs could present information about the item, as described above.

Therefore, in a general sense, the device 7 in FIG. 7 captures an image of a view seen by the person operating the device 7. That view is the reality under consideration.

That reality is augmented by information which is superimposed, or overlaid, onto the image. The information can be static, as in print information, or can be dynamic, as in a video or cartoon. The augmentation information can also be dynamic in the sense that, if the customer takes a sequence of different images as the customer moves through the store, or venue 3 in FIG. 1, then the augmentation will continually change accordingly.

The augmenting information can be of varying degrees of opacity, so that it need not obscure the underlying view. As a specific example, the augmenting information can take the form of hollow text which crawls across the display, in the manner of movie titles. The underlying reality can be seen through the hollow parts of the text, as well as through the outlines of the text, if the outlines are not completely opaque.

In some of the scenarios described above, the invention offered a type of guidance to the person 6 in FIG. 1, as in guiding the person to a location within a retail store.

Other types of guidance are possible. For example, if the person 6 in FIG. 1 is a technician repairing an aircraft component, the device 7 can take a picture of the component. The component can then be identified as described above, as by image recognition, or assisted recognition. The picture of the component becomes the underlying reality.

Then the device 7 can offer guidance to the technician. For example, if the technician wishes to open the component, a certain latch may require activation. The device 7 can present a photograph of the latch, together with a banner pointing to a location on the image where the latch is located. Thus, two prompts are offered to the technician: (1) what the latch looks like and (2) where it is located.

Figure 8:
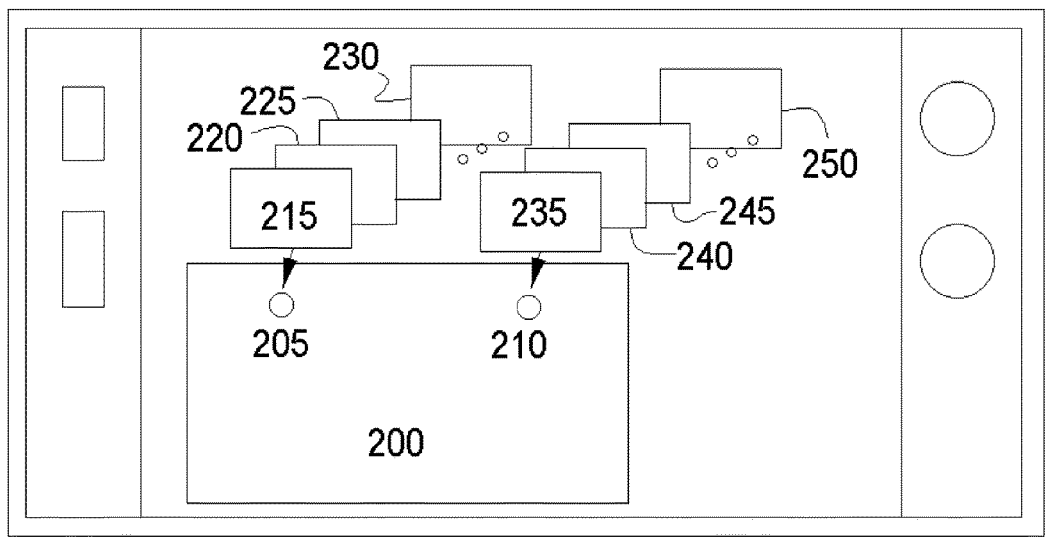
FIG. 8 is a block diagram of one form of the invention.

In FIG. 8, the photograph can be represented by block 215, and the latch represented by circle 205, to which an arrow points.

The device 7 can repeat this process, to assist the technician in replacing components. The technician is given an image of a component to be replaced, together with augmentation which indicates where the component is located within the reality of the initial image.

In addition, the device can explain to the technician how to connect test equipment to a sub-component. For example, the sub-component is first located within the component, as described above. The device 7 instructs the technician to take an image of the sub-component. The device 7 then augments the image with a banner which shows test equipment, such as an oscilloscope, together with images of the test leads in this case. Additional augmentation banners show where to connect the leads (illustrated in an augmented banner) to the sub-component (shown in an image taken by the technician).

Therefore, the invention augments a reality perceived by the person 6 in FIG. 1. That reality can take the form of a digital photograph taken by computing device 7. That device 7, perhaps in conjunction with other apparatus, deduces information about the reality which would be of interest to the person 6.

That deduction process can involve current active input from the person 6, as when the person submits a shopping list. Alternately, that deduction process can involve passive input from the person 6, as when (1) person 6 owns a loyalty card of a retail establishment, (2) person 6 is currently visiting that retail establishment, and (3) historical data indicated by the loyalty card is consulted. The historical data represents passive input.

Once deductions are made which identify information which would be of interest to the person 6, such information is displayed on device 7, by overlaying the information on the image of the reality to which the information relates, as in FIG. 7.

Then the process can repeat, as the reality changes, as would occur as the person 6 moves through the venue 3 of FIG. 1.

The Inventor points out that, in the case of person 6 traveling through a retail store, the underlying reality will change continually. The reason is that (1) the person's location in the store will change, (2) the image of the reality viewed by the person will change, or (3) a combination of (1) and (2). (As to item (3) it is pointed out that, if the person stands in one place, but takes an image facing north, and then an image facing east, the underlying reality will change, yet, in a sense, the person has not moved.)

As the underlying reality changes, the invention augments it with changing information, superimposed on the image of that reality. Further, in the retail example, the choice of information can depend on characteristics of the person, such as past purchasing behavior, or demographic data obtained from a loyalty card.

In one approach to providing the augmentation information, the retail store will initially identify a multiplicity of possible underlying realities, such as the numerous views of the shelving within the store which can be taken by the device 7. The operator of the store determines, for each underlying reality, a universe of information. The operator then selects a proper subset of that universe according to information supplied by device 7, and transmits the subset to the device.

For example, if the underlying reality is a view of shelves containing bath soaps, the universe will be of information relating to such soaps, such as chemical content, health effects, prices, and so on. Then, when one of the realities is present on the display of the device 7, the invention selects information from the universe which is relevant to that reality. The selection can be made partly based on characteristics of the individual.

FIG. 8 illustrates a generalized view of one form of the invention. The device 7 displays an image 200, which represents a reality currently visible to the device 7. The image 200 contains an item 205 which is considered to be of interest to the person 6 of FIG. 1.

Blocks 215, 220, 225, and 230 represent a collection of sets of information which are relevant to the item 205, and the arrow pointing to item 205 is displayed to indicate that relevance. That is, the arrow extending from item 215 indicates that item 215 is more relevant to item 205 than to item 210.

For example, image 200 may represent an automatic transmission in a motor vehicle. Item 205 may represent an inspection port, covered by a door. Block 215 may represent instructions on how to open the door.

Block 220 may represent a view of components which are located behind the door. Block 225 may represent a test procedure to be performed on a component within that view. The blocks of information need not be displayed simultaneously, if space does not permit, but can be cycled through by the user.

Similar comments apply to item 210, and blocks 235, 240, 245, and 250.

The informational blocks such as 215 can be viewed as footnotes to an item 205, and can have the normal characteristics of footnotes. For example, a footnote generally provides detailed information which is highly specific, and not needed in a general discussion.

Further, block 220 can be a footnote to block 215, in the sense that block 220 may have no clear relevance to the underlying reality 200, but is relevant to block 215. For example, the underlying reality 200 may be a culinary dish, which may contain onions, but the onions are not apparent from the image of the reality 200.

Block 215 may list the ingredients of the dish, including the onions. Block 220 may be an explanation of how to cut and sauté the onions in a particular manner. Thus, block 220 would be relevant to block 215, but not obviously relevant to image 200.

A generalized procedure undertaken by the invention is the following. The person 6 in FIG. 1 uses the device 7 to take a picture of a component 200 in FIG. 8. The component 200 may be located in the venue 3 in FIG. 1, and is part of an external reality which is visible to the person 6. Multiple components 200 may be present, and may appear on the display of the device 7.

Device 7 is a general purpose device which accomplishes functions of interest to a generalized person 6 in FIG. 1, such as a digital camera, or portable computer. Device 7 is not, for example, a scanner used by an employee of a store to read bar codes and transmit information to an inventory control system of the store's computer.

In one embodiment, the component 200 in FIG. 8 is not under the control of the person 6, as when the component 200 is an item for sale in a retail store, or is an exhibit in a museum. In another embodiment, the component 200 is under the control of the person 6, as when component 200 is a transmission being serviced by person 6.

The device 7 transmits, to an agency at a remote location, information which allows the agency to identify the component 200. In one embodiment, the agency is not under control of the person 6. In another embodiment, the agency can be an affiliate, such as an employer or military superior, of the person 6.

In one embodiment, the identifying information is insufficient for the person 6 to identify the component 200. For example, a bar code does not allow person 6 to identify the component 200. Similarly, if geometric coordinates of an object are deduced, as described above in connection with FIG. 5, those coordinates do not allow the person to identify the component 200. As a specific example, in one embodiment, the manufacturer or model number, or both, of component 200 would identify the component 200 to the person 6, and that data is not transmitted to the agency.

The agency identifies the component 200, locates information relating to the component 200, and transmits the information to the device 7. The device 7 places the information onto its display, overlaying the information onto the image of the component 200, in the manner of blocks 215 or 220 in FIG. 8.

In addition, arrows or other indicia of relevancy, such as the arrow extending from block 215 to circle 205 in FIG. 8, can be added to indicate areas of the display to which the information is relevant.

Additional Considerations

1. If the venue 3 in FIG. 1 is an automotive dealership, block 15 may provide technical bulletins to the person 6. "Technical bulletin" is a term of art for circulars prepared by a manufacturer which are sent to dealers, which describe specific problems which have been discovered in a particular motor vehicle, and which generally offer solutions.

Many technical bulletins are publicly available, and can be found on the Internet.

2. As another automotive example, the purchaser may wish to learn of safety recalls, or other safety issues, involving the vehicle under consideration. The U.S. government publishes some information of this type, as at the Consumer Products Safety Commission. Block 15 can provide access to this.

3. As another automotive example, the purchaser may wish to learn the relative standing of the vehicle to be purchased, relative to similar vehicles. Such standings are reported by independent testing agencies, such as Consumers Union in the United States, which publishes "Consumer Reports," and various enthusiast magazines written about cars. This standing information may assist the purchaser in bargaining with a sales representative.

Therefore, in one form of the invention, the device 7 contacts third parties, which are unaffiliated with the manager of venue 3, such as those identified in points 1-3 immediately above, in order to collect additional information about the item to be purchased. This contact can be done through the Internet, and can be done at the site of the venue 3. As stated above, the device 7 can at this time also collect information provided by the manager of the venue 3, either through the Internet, through a local network provided by the venue 3, or through a third medium.

In retrieving this information, the person 6 may be given the option of requesting a live conference with an assistant, either by telephone or equivalent, or by requesting that the assistant personally assist the customer.

4. In one form of the invention, the person 6 retrieves a map of the store, using one of the approaches described herein. The current location of the shopper on the map is determined, as by having the shopper visually determine his location, and then insert his location on the map, as by positioning a cursor. Or the device can ascertain the shopper's location without the shopper's involvement. Apparatus for performing such location are known in the art.

Once the device is equipped with a map of the store, the device displays information needed for the shopper to navigate the store. For example, if the shopper drags a cursor to a location on the map, the map will show an enlarged view of the region surrounding the cursor. The device determines the coordinates of that region, retrieves information which describes the products in that region, and displays the information.

The shopper can repeat the process on the enlarged view, and eventually isolate a specific item, for which the shopper then requests information.

It is pointed out that this procedure can be accomplished at a home computer, over the Internet, if the venue 3 provides the proper data and programming at a web site.

In another form of the invention, the device is equipped with a camera, and also apparatus which can determine the compass direction in which the camera is pointing. For example, assume that the shopper is located within a rectangular building having its long axis aligned north-south. Assume that the four walls are painted different colors.

The camera, in general, converts images which it sees into bitmaps. Each bit is associated with a number, which represents color, intensity, and possible other data. Thus, the bitmap can indicate the direction which the camera is pointing, based on the color of the bitmap.

For example, if the camera is pointing directly at the north wall, the camera will see an entire field of a single color, and that color indicates the north wall.

If the camera is pointing northwest, for example, processing circuitry within the camera can examine the colors seen, and deduce that the direction is northwest.

5. In one form of the invention, venue 3 is a retail store. The device 7 retrieves a master list of products which are offered for sale at the venue 3. This master list can be obtained from the venue 3 via the Internet.

The person 6 checks off items on the master list which are to be purchased. As the person 6 travels through the venue 3, his location would be ascertained. The device 7 determines, from the master list and the location of the device 7, which of the selected items are nearby. The device 7 notifies the person 6 of those nearby items.

In this way, the person 6 can generate a shopping list, and travel through the venue 6, unguided. The device 7 will signal the person 6 when selected items are nearby.

Since the master list, by supposition, was created by the store, the identification of the products is unambiguous, from the store's perspective. That is, each item on the master list is directly correlated with an item known to be located within the venue.

In contrast, if the person 6 generated his own list, and included the item "Brand G chocolate cake mix," such a cake mix may not be present at the venue 3. Or the actual trade name of the item may be "Brand G Exquisitely Chocolate Cake mix." This latter name, given by the person, may not be recognized by the venue 3.

The use of the master list assures that correct nomenclature is used, because the items are required to be selected from a universe of possible items which is defined by the venue 3.

6. The approach of the master list, described immediately above, can be applied to museums and travel destinations generally. The museum or destination provides a master list of items to be visited, and device 7 indicates when those items are nearby, during the movements of the person 6.

7. It is pointed out that, in some embodiments, device 7 may not be the agency which deduces its location within the venue 3. For example, equipment associated with server 9 may determine the location of device 7, and then transmit information to device 7 about nearby items. In this case, device 7 may not learn of its own position, in terms of the specific coordinate data computed by server 9.

8. The location of the device 7 within the venue 3 can be deduced based on image recognition. For example, device 7 in FIG. 5 can use its camera 30 in FIG. 1 to capture an image along direction D in FIG. 5. That image can be sent to a computer of the venue 3, which would recognize the image, and deduce the location from which the image was taken.

Alternately, items 53 in FIG. 5 can take the form of markers, which contain visible symbols, or other symbols which a computer can recognize from a digital photograph taken of the symbols. The device 7 takes an image of a nearby marker 53 and transmits the image to the computer of the venue 3. The latter deduces the location of the marker, and thus the location of the device 7.

9. In one form of the invention, the person 6 in FIG. 1 browses through the venue 3 and takes images of selected items, using camera 30. Each item is identified, as described herein, and compiled into a list. In one form of the invention, the person 6 is not involved in making the identifications, except passively by taking photographs.

The list can act as a "wish list" for items to be purchased later, if the venue 3 is a retail store. The venue 3 can provide, to the device 7, addresses of web sites, that is, URLs, Uniform Resource Locations, when it provides the identities of the items photographed. The web sites can identify the manufacturers of the items, or otherwise provide further information about the items.

The list can act as a research assignment, if the venue 3 is a museum or travel destination. In the case of a museum, the venue 3 can assist the research by providing addresses of web sites when it provides the identities of the items photographed. The web sites provide further information about the items.

10. Some of the computation described above can be done cooperatively, between the device 7 and the venue's systems.

Numerous substitutions and modifications can be undertaken without departing from the true spirit and scope of the invention. What is desired to be secured by Letters Patent is the invention as defined in the following claims.

The invention claimed is:

1. A method of operating a portable computing device in cooperation with a venue, comprising:
   a) maintaining in the device an apparatus which ascertains position of the device within a venue through which a human operator of the device travels, wherein the apparatus is a map that indicates a spatial distribution of objects within the venue, and wherein maintaining further includes identifying a cursor location situated within the map by the human operator for ascertaining the position of the device within the venue, and wherein maintaining further includes obtaining, by the device, the map from a server of the venue over a network connection:
   b) maintaining in the device the apparatus which uses said position to identify the objects located near said position, wherein a human operator configured distance from the position to the objects determines the objects near the position: and
   c) using said device to retrieve information about an object identified from the server over the network connection and displaying the object identified and the information on a display of the device.

2. The method according to claim 1, in which the venue is a retail store, and at least one object comprises an item of merchandise.

3. A method of operating a portable computing device in cooperation with a venue, comprising:
   a) determining position of the device within the venue by obtaining, by the device, a map of the venue over a network connection between the device and a server of the venue and identifying a cursor location placed within a displayed version of the map by an operator of the device as being the position of the device within the venue;
   b) based on position determined, identifying a group of items within a predetermined distance from the position, wherein the predetermined distance received as an option from the operator of the device;
   c) displaying data indicating the group on the device, wherein displaying further includes obtaining the data from the server over the network connection;
   d) receiving on the device a selection of an item in the displayed group; and
   e) transmitting the selection to the server of the venue.

4. The method according to claim 3, in which the venue is a retail store, and the item comprises merchandise for sale.

5. The method according to claim 3, in which the venue comprises a museum, and the items comprise exhibits within the museum.

* * * * *